(12) United States Patent
Chiang et al.

(10) Patent No.: US 9,031,128 B2
(45) Date of Patent: May 12, 2015

(54) VIDEO ENCODING

(75) Inventors: Patricia Wei Yun Chiang, Singapore (SG); Jucas Y. W. Hui, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 2594 days.

(21) Appl. No.: 10/500,453

(22) PCT Filed: Dec. 31, 2001

(86) PCT No.: PCT/SG01/00261
§ 371 (c)(1),
(2), (4) Date: Mar. 10, 2005

(87) PCT Pub. No.: WO03/056839
PCT Pub. Date: Jul. 10, 2003

(65) Prior Publication Data
US 2005/0180500 A1    Aug. 18, 2005

(51) Int. Cl.
*H04N 7/12* (2006.01)
*H04N 19/42* (2014.01)
*H04N 19/176* (2014.01)
*H04N 19/122* (2014.01)
*H04N 19/60* (2014.01)
*H04N 19/124* (2014.01)
(Continued)

(52) U.S. Cl.
CPC .............. *H04N 19/42* (2014.11); *H04N 19/176* (2014.11); *H04N 19/149* (2014.11); *H04N 19/15* (2014.11); *H04N 19/122* (2014.11); *H04N 19/61* (2014.11); *H04N 19/60* (2014.11); *H04N 19/124* (2014.11); *H04N 19/14* (2014.11); *H04N 19/152* (2014.11); *H04N 19/194* (2014.11); *H04N 19/619* (2014.11)

(58) Field of Classification Search
CPC ... H04N 19/122; H04N 19/124; H04N 19/14; H04N 19/149; H04N 19/15; H04N 19/152; H04N 19/176; H04N 19/194; H04N 19/42; H04N 19/60; H04N 19/61; H04N 19/619
USPC ...................................................... 375/240.03
See application file for complete search history.

(56) References Cited

U.S. PATENT DOCUMENTS 5,644,504 A * 7/1997 Boice et al. ................... 382/248
5,677,734 A * 10/1997 Oikawa et al. ........... 375/240.04
(Continued)

FOREIGN PATENT DOCUMENTS

EP      0 778 708 A2    6/1997
EP      0912062 B1 * 10/1998
(Continued)

OTHER PUBLICATIONS

Jeong-Woo Lee and Yo-Sung Ho, Target Bit Matching for MPEG-2 Video Reate Control, 1998, IEEE p. 66-69.*
(Continued)

*Primary Examiner* — Jessica M Prince
(74) *Attorney, Agent, or Firm* — Seed IP Law Group PLLC

(57) ABSTRACT

A method for use in encoding video data, including generating metric values for the video data based on a metric function and respective encoding parameters. At least one of the encoding parameters is selected on the basis of a desired quantity of encoded video data and a predetermined relationship between metric values and respective quantities of encoded video data.

29 Claims, 8 Drawing Sheets

(51) Int. Cl.
*H04N 19/14* (2014.01)
*H04N 19/152* (2014.01)
*H04N 19/194* (2014.01)
H04N 19/149 (2014.01)
H04N 19/15 (2014.01)
H04N 19/61 (2014.01)

(56) References Cited

U.S. PATENT DOCUMENTS

| | | | | |
|---|---|---|---|---|
| 5,802,213 | A | * | 9/1998 | Gardos ............... 382/239 |
| 5,923,376 | A | * | 7/1999 | Pullen et al. ........ 375/240.16 |
| 6,947,378 | B2 | * | 9/2005 | Wu et al. ............ 370/229 |

FOREIGN PATENT DOCUMENTS

| | | |
|---|---|---|
| EP | 0 912 062 B1 | 4/1999 |
| EP | 1 006 731 | 6/2000 |

OTHER PUBLICATIONS

Lee, J-W., et al., "Target Bit Matching for MPEG-2 Video Rate Control," in *Proceedings of the IEEE TENCON*, New Delhi, India, Dec. 17-19, 1998, pp. 66-69.

"Specifications of Consumer-Use Digital VCRs Using 6.3mm Magnetic Tape," HD Digital VCR Conference, Dec. 1994, 22 pages.

De With, P.H.N., "Motion-Adaptive Intraframe Transform Coding of Video Signals," Philips Journal of Research, 1989, 44(2/3), pp. 345-364.

Ding, W. et al., "Rate Control of MPEG Video Coding and Recording by Rate-Quantization Modeling," IEEE Transactions on Circuits and Systems for Video Technology, Feb. 1996, 6(1), pp. 12-20.

Rhee, S., et al., "A New Quantizer Selection Scheme for Digital VCR," IEEE Transactions on Consumer Electronics, Aug. 1997, 43(3), pp. 879-885.

MPEG-2 [ISO-IEC/JTC1/SC29/SC29NVG11, "Test Model 5," Draft, Apr. 1993] "10 Rate Control and Quantization Control."

* cited by examiner

VIDEO ENCODING

FIELD OF THE INVENTION

The present invention relates to video encoding, and in particular to a method for use in encoding video data, a video encoding module and a video encoder.

BACKGROUND

Bit rate control is important in video coding and related applications and is normally achieved by selecting an appropriate quantization matrix or quantizer to encode the picture. An 8×8 quantizer is an 8×8 matrix of integer valued step sizes that is used to divide video data in the form of 8×8 matrices of frequency coefficients produced by the discrete cosine transformation (DCT) of input video frames, and thereby reduce the amount of encoded video data. In the case of the digital video (DV) standard, as described in *Specifications of Consumer-Use Digital VCRs using 6.3 mm magnetic tape*, HD Digital VCR Conference, December 1994, the quantizer is determined by three numeric parameters known as area, class and quantization number. The area and class are integers between 0 and 3, inclusive. For a given pixel, the area number for that pixel is determined by the pixel's position in an 8×8 pixel block. A class number is assigned to each 8×8 pixel block on the basis of the block's content, for example, quantization noise and the maximum absolute value of the block's AC coefficients. The quantization number or step is an integer that specifies the degree of image quantization, and is assigned to a macroblock consisting of four luminance 8×8 pixel blocks and two chrominance 8×8 pixel blocks. The combination of the class and quantization number determines a quantization vector comprising four quantizer coefficients, one for each area number. An 8×8 quantizer is constructed from the quantization vector by entering each coefficient into corresponding positions in the quantizer, according to area number. The resulting quantizer determines the quantity of output video data generated from a given macroblock of input video data. A video segment, consisting of five macroblocks, is encoded within a constant bit budget by selecting a suitable quantization vector for each macroblock to provide a bit rate of the encoded video data is as close as possible to a constant target value.

U.S. Pat. No. 5,677,734, Method and Apparatus for Modifying the Quantization Step of each Macro-block in a Video Segment, describes a method of modifying the quantization step of each macroblock in a video segment. As shown in the accompanying FIG. 1, a video encoding system includes an activity detector 104 that detects the picture activity of each 8×8 pixel block and classifies the blocks by class number. Notwithstanding its name, a data estimation circuit 108 calculates the exact number of bits generated by the data in the segment memory 103 by quantization, run-length and Huffman coding, given a quantization number. A first quantization step decision circuit 106 determines a segment wide quantization number, and a second quantization step decision circuit 107 modifies the quantization number for each macroblock so that the quantity of quantized data is below a predetermined bit budget. A quantization circuit 105 quantizes the data with the resulting quantization number and a variable length coding (VLC) circuit 110 encodes the data by run-length and Huffman coding.

A paper by S. Rhee et al., *A New Quantizer Selection Scheme for Digital VCR*, IEEE Transactions on Consumer Electronics, Vol. 43, No. 3, August 1997, discloses a method of determining the quantization and class numbers to select a quantizer for each 8×8 pixel block. A modified quantizer map, QID, from a reduced set of quantization vectors was introduced. A segment-wide QID was first selected by calculating data quantity through quantization and variable length encoding. The selected QID was then mapped to the respective quantization and class numbers. The quantization vector for each 8×8 pixel block was fine-tuned by adjusting the class number according to the calculated data quantity.

A paper by W. Ding and B. Liu, *Rate Control of MPEG Video Coding and Recording by Rate-Quantization Modeling*, IEEE transactions on Circuits and Systems for Video Technology, Vol. 6, No. 1, February 1996, describes controlling the video bit rate by using a feedback re-encoding method with a rate-quantization model. This rate-quantization model was adapted with re-encoding results to choose a suitable reference quantization parameter for meeting a target bit rate.

The difficulty in controlling bit rate lies in how to choose the quantization parameters to meet a target bit rate budget. Prior art methods have attempted to solve this difficulty by trying out selected combinations of all possible quantization parameters. However, these methods require complex hardware and/or significant computational overheads. They require a multi-pass implementation of the processes of quantization and variable length encoding.

Even rate-quantization modeling is dependent on either re-encoding or training sequences and classification schemes. The former has the disadvantage of local adaptation with quantization parameter and the requirement of two to three-pass encoding, while the latter is impractical for real-time video transmission and quality control. In addition, the rate-quantization model has only been used on a frame-basis. There may be a model mismatch for finer bit estimation due to the fast changing nature of the rate-quantization model at low bit rates.

It is desired, therefore, to provide a method for use in encoding video data, a video encoding module and a video encoder that alleviate one or more of the above difficulties, or at least a useful alternative to existing methods, modules and encoders.

SUMMARY OF THE INVENTION

In accordance with the present invention there is provided a method for use in encoding video data, including generating metric values for said video data based on a metric function and respective encoding parameters, and selecting at least one of said encoding parameters on the basis of a desired quantity of encoded video data and a predetermined relationship between metric values and respective quantities of encoded video data.

Preferably, said metric function is based on AC coefficients of discrete cosine transformation data generated from said video data.

Advantageously, the metric function may be a spatial activity metric based on a sum of weighted AC discrete cosine transformation coefficients.

Advantageously, the metric function may be based on the number of non-zero AC discrete cosine transformation coefficients after quantization.

The present invention also provides a video encoding module having components for executing the steps of any one of the preceding methods.

The present invention also provides a video encoding module, including a predictor module for determining estimates for the quantity of encoded video data using respective quantization vectors, and a selector module for selecting at least one of said quantization vectors on the basis of said estimates.

The present invention also provides a video encoding module, including a predictor module for determining estimates for bit rate values representing the quantity of encoded video data using respective quantization vectors, a selector module for selecting two of said quantization vectors on the basis of said estimates, first quantization and variable length coding modules for generating first encoded video data using a first of said selected quantization vectors, second quantization and variable length coding modules for generating second encoded video data using a second of said selected quantization vectors, and an output decision module for selecting one of said first encoded video data and said second encoded video data for output on the basis of at least one of the bit rate value of said first encoded video data and the bit rate value of said second encoded video data.

The present invention also provides a video encoder, including any one of the above video encoding modules.

The present invention also provides a digital video (DV) encoder, including any one of the above video encoding modules.

The present invention also provides an MPEG encoder, including any one of the above video encoding modules.

Instead of calculating the data quantity to be generated by actually encoding the video data, preferred embodiments of the invention use a predictor to estimate the data quantity. The predictor uses a metric for the process of quantization, run-length and Huffman coding, to predict an output bit rate or data quantity.

BRIEF DESCRIPTION OF THE DRAWINGS

Preferred embodiments of the present invention are hereinafter described, by way of example only, with reference to the accompanying drawings, wherein.

DETAILED DESCRIPTION OF THE PREFERRED EMBODIMENTS

Figure 1:
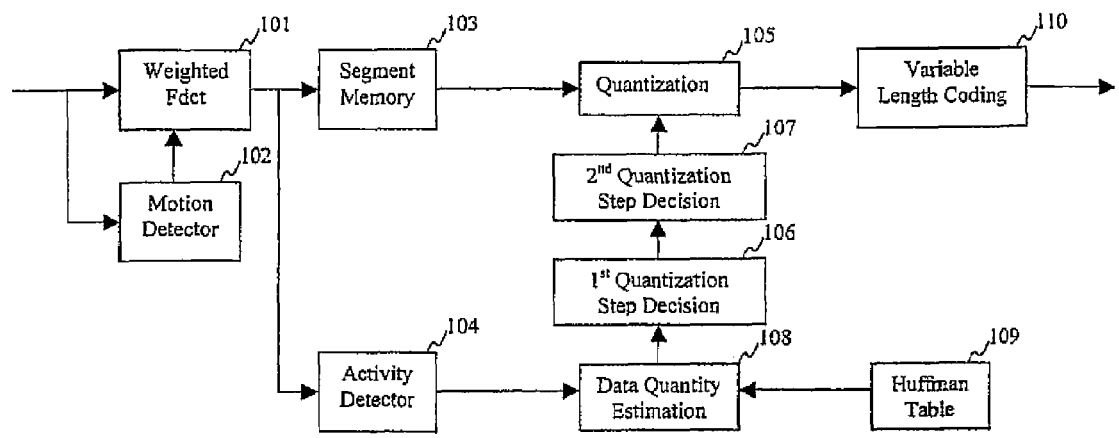
FIG. 1 is a block diagram of part of a prior art DV encoder.

Bit rate control involves determining a suitable set of encoding parameters for generating encoded video data with a desired bit rate from input video data. Encoders of the preferred embodiments described below each provide a predictor to estimate the quantity of data produced by encoding given input video data. The difficulty of achieving this is apparent from the observation that the relationship between the quantity of encoded data and quantization parameters varies for different macroblocks, different video segments, different parts of the same sequence and even different kinds of sequences. Consequently, the preferred embodiments provide metric functions, as described below, to determine metric values from input video data that correlate with the actual quantity of output video data generated by encoding the input video data. An estimate for the quantity of data is then determined from a predetermined relationship between metric values and bit counts. The relationship is determined experimentally for a given metric function and reference video data. The predictor generates a metric value from input video data using the metric function, and then converts the metric value to a bit count estimate using the predetermined relationship.

To determine suitable metric functions, the three processes of quantization, run-length encoding and Huffman encoding have been considered. A close inspection of the Huffman table reveals that longer codewords are associated with longer run lengths and also with larger amplitudes. The reason for this is that long run lengths and high amplitudes occur with lower probabilities. Consequently, an 8×8 pixel block with many low amplitude and short run codes can generate a total codeword of comparable length to another block that has few high amplitude and long run codes. Hence the spatial activity of the block is a good measure of the codelength.

A conventional metric function for analysing the contents of a pixel block using the AC energy or variance, $\Sigma_{u,v} f(u,v)^2$, where $f(u,v)$ is the DCT coefficient of the AC block element with coordinates $(u,v)$, is insufficient. However, a slightly modified spatial activity metric, described by $$\sum_{u,v} |f_w(u, v)| = \sum_{u,v} \frac{|f(u, v)|}{w(u, v)},$$

can be used to estimate codelength. This metric, the sum of the weighted AC coefficients in an 8×8 pixel block, where $w(u,v)$ are the weights applied to the AC coefficients in DV systems, can be correlated with the quantity of data generated by variable length coding. By dividing this metric by the quantization step size used, a block spatial activity metric that also incorporates the influence of quantization is obtained. This block spatial activity metric, $$act = \sum_{u,v} \frac{|f_w(u, v)|}{q(u, v)},$$

provides a link between quantization and the number of bits of encoded data, where q(u,v) refers to the quantization step size used on element (u,v) of the block.

The metric may be further extended to include the spatial influence of the AC coefficients in the block. The further the AC coefficient is from the DC coefficient in terms of run-length coding, the better the chances of a longer run, given the characteristics of the discrete cosine transform. Hence a longer codeword is expected for an AC coefficient far from the DC coefficient. This extended metric is given by $$actp = \sum_{u,v} \frac{|f_w(u,v) * h(u,v)|}{q(u,v)},$$

where h(u,v) is a spatial weighting on the AC coefficients and is determined experimentally.

The spatial activity metric functions act and actp described above can be independently used to generate a metric value from input video data and a given quantization vector that correlates with the actual quantity of data generated by encoding the input video data using the same quantization vector, and hence the bit rate. By generating a series of these values for respective quantization vectors, a general relationship can be determined between the quantity of encoded video data and either one of the spatial activity metrics, using reference input video data. Although this relationship is determined from reference video data, it can be applied in a quasi-universal manner to any input video data to determine an accurate estimate for the quantity of encoded data or the bit rate. The estimate enables input video data to be encoded with simple single-pass quantization and variable length encoding steps to generate encoded video data having a bit rate close to a desired bit rate.

The preferred embodiments of the invention are described in relation to the DV standard in order to select quantization vectors for 8×8 pixel blocks so as to maintain a constant bit rate. However, it will be appreciated that the invention can be applied in a more general sense to select encoding parameters to provide the closest match to any (e.g., variable) target bit rate or data quantity.

The choice of an appropriate quantizer is important for DV, because excess bits that are generated through the quantization and variable length coding processes are dropped. The DV encoder therefore ensures that the number of bits of encoded data representing the AC coefficients of each five-macroblock video segment (vs) is kept below a predetermined bit budget:

$$\sum_{i=1}^{5} bits_i \le targetbits_{vs}$$

$$bits_i = f(QV_i)$$

where $bits_i$ is the number of bits generated from the variable length coding of the $i^{th}$ macroblock of the video segment, and $targetbits_{vs}$ is a predetermined bit budget for the video segment. For example, the bit budget may be 2560. A set of five quantization vectors is to be found for the video segment, one for each macroblock, and $QV_i$ refers to the quantization vector used for macroblock i.

The quantization problem in DV is complicated by the use of different quantization steps for each of the four different areas of an 8×8 pixel block. For application of the actp metric to DV, the sum of the spatial activity metrics for a macroblock can be written as $$s\_actp_i = \sum_{k=1}^{6} \sum_{j=0}^{3} \frac{\sum |AC_{jk}|}{q_{jk}} * h(j),$$

where i, j, k denote, respectively, the index of the $i^{th}$ macroblock in the video segment, the index of the $k^{th}$ 8×8 pixel block in that macroblock, and the area number j. The magnitudes $|AC_{jk}|$ of the AC coefficients in a particular area jk of an 8×8 pixel block are summed and the sum is then divided by the common quantization step $q_{jk}$ used for that area. The result is multiplied by a weight h(j) relating to the emphasis of the AC coefficients of that particular area. For example, the weights for the respective areas may be in the ratio of {1,2,4,8} for respective areas {0,1,2,3}.

Figure 2:
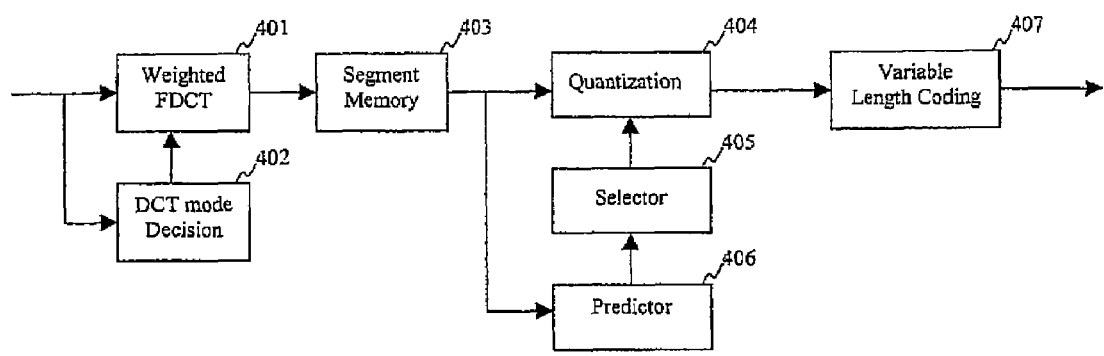
FIG. 2 is a block diagram of a first preferred embodiment of a video encoder.

A digital video (DV) encoder, as shown in FIG. 2, includes a discrete cosine transformation (DCT) mode decision module 402, a weighted forward DCT (FDCT) module 401, a segment memory 403, a predictor module 406, a selector module 405, a quantization module 404, and a variable length encoding module 407. The DCT mode decision module 402 analyses each 8×8 pixel block based on edge and or inter-field motion detection, as described in P. H. N. de With, *Motion-Adaptive Intraframe Transform Coding of Video Signals*, Philips Journal of Research, Vol. 44, No. 2/3, pp 345-364, April 1989, to select a suitable DCT mode, either 8×8 or 2×4×8. The weighted FDCT module 401 performs a two-dimensional discrete cosine transform, followed by a weighting multiplier. A video segment of data, consisting of five macroblocks from different locations of a frame, is stored in the segment memory 403 for further processing. Each macroblock of the video segment consists of four luminance 8×8 pixel blocks and two chrominance 8×8 pixel blocks.

The video encoder controls the bit rate of an encoded data video segment by determining predicted values or estimates for the quantity of encoded data for each macroblock within the segment for different quantization vectors, and selecting a quantization vector for each macroblock to obtain the closest bit rate to a desired target bit rate.

In the first preferred embodiments, predicted bit counts are determined by methods based on block spatial activity and executed by the predictor 406. A first preferred embodiment is first described, in which the predictor 406 executes a method based on the spatial activity function actp. A second preferred embodiment is then described in which the predictor 406 uses the simpler spatial activity function act, as indicated. However, because these embodiments differ only in the form of the spatial activity metric function used, much of the description below applies equally to both embodiments, as indicated.

Figure 3:
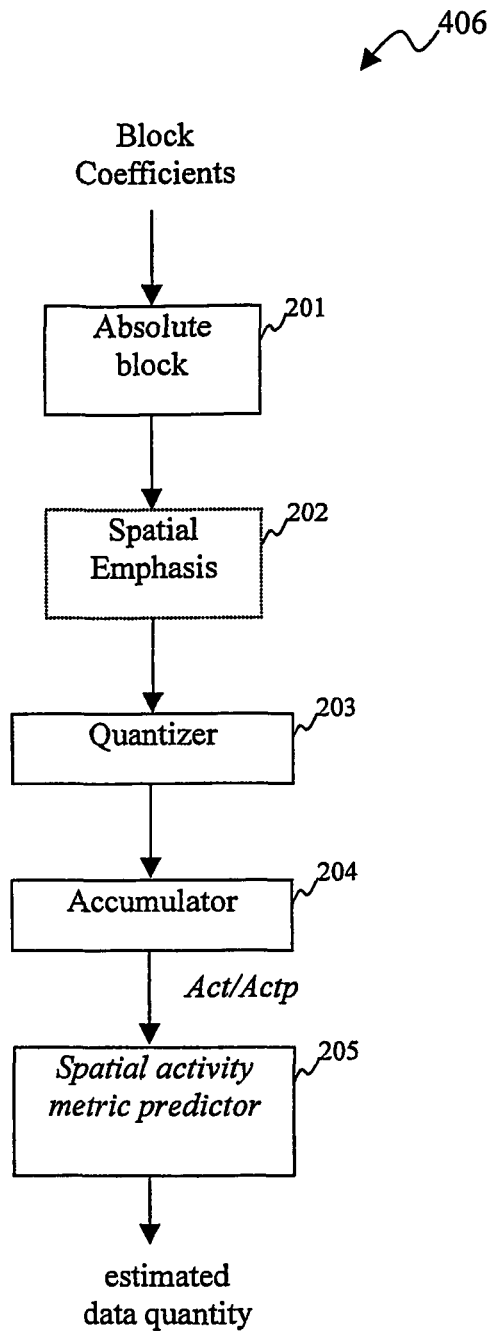
FIG. 3 is a block diagram of a first preferred embodiment of a predictor of the encoder.

As shown in FIG. 3, the predictor 406 includes an absolute block 201, a quantizer block 203, an accumulator 204, and a spatial activity metric predictor 205. For the actp metric, the predictor 406 also includes a spatial emphasis block 202. The predictor 406 is a dedicated hardware circuit, as described below, or a processor such as an ST100 or ST200 processor manufactured by STMicroelectronics, in which case the blocks 201 to 205 are software modules executed by the processor. The other components of the encoder are standard DV components known in the art, such as those of a Divio™ NW701 single chip CODEC.

The predictor module 406 models the process of quantization and variable length coding using the actp metric function. It calculates the s_actp values as described above, and then predicts the number of bits generated from a macroblock for all possible quantization vectors, using an empirically determined relationship between s_actp and bit count, as described below.

For a given set of quantization parameters, the bit count contribution from an 8×8 pixel block is estimated by the predictor 406 of FIG. 3 as follows. The absolute block 201 reads in the DCT coefficients for the block sequentially and then outputs their magnitudes. For the actp metric, where spatial influence is taken into account, the spatial emphasis block 202 multiplies each coefficient by a weight based on the position of the coefficient in the pixel block. The quantizer block 203 then quantizes the coefficients with respect to the quantization step size. However, the quantization and spatial emphasis steps can alternatively be combined and reduced to shift operations, as described below. The accumulator 204 sums the quantized, weighted coefficients to determine the act or actp metric value for the pixel block, as appropriate. The metric value for a macroblock is determined by summing the act/actp values of its six constituent pixel blocks. The spatial activity metric predictor 205 derives an estimated bit count for the macroblock based on the summed act/actp values and an empirically determined relationship between metric values and bit counts. This relationship determines the conversion between metric values and bit counts, and can be implemented in the spatial activity metric predictor 205 by calculating a mathematical function, as described below, or, to improve efficiency, as a non-linear look-up table. The process of FIG. 2 is repeated for all quantization vectors to determine a bit count estimate for each quantization vector. However, the repetition may be minimised or even eliminated by identifying a basic set of quantization vectors, determining act/actp values for these basic quantization vectors and deriving the remaining act/actp values with shift operations thereof, as described below.

Different combinations such as the quantization and class numbers can be used to generate an indexed set of possible quantization vectors, as shown in Table 1. Several of these vectors are multiples of other vectors in the set, allowing them to be classified into four groups, with the members of each group being members of each group being multiples (by powers of 2) of a common quantization unit vector $\vec{q}_u$ for the group, as shown in Table 2. A set of four basic quantization vectors $\vec{b}$, can then be defined for the respective groups, as shown in Table 2, as the vector quotients of a weight vector $\vec{w}$ representing the weights h(j) applied to different areas of an 8×8 pixel block, as described above, and the four quantization unit vectors $\vec{q}_u$.

TABLE 1

| Index | Quantization Vector |
|---|---|
| 0 | 1 1 1 1 |
| 1 | 1 1 1 2 |
| 2 | 1 1 2 2 |
| 3 | 2 2 2 2 |
| 4 | 2 2 2 4 |
| 5 | 2 2 4 4 |
| 6 | 2 4 4 8 |
| 7 | 4 4 8 8 |
| 8 | 4 8 8 16 |

TABLE 1-continued

| Index | Quantization Vector |
|---|---|
| 9 | 8 8 16 16 |
| 10 | 8 16 16 32 |
| 11 | 16 16 32 32 |

TABLE 2

| Quantization Vector $\vec{q}$ | Quantization Unit Vector $\vec{q}_u$ | Shift Value x | Basic Vector $\vec{b} = \vec{w}/\vec{q}_u$, $\vec{w} = [1\ 2\ 4\ 8]$ |
|---|---|---|---|
| 1 1 1 1 | 1 1 1 1 | 0 | 1 2 4 8 |
| 2 2 2 2 | | 1 | |
| 1 1 1 2 | 1 1 1 2 | 0 | 1 2 4 4 |
| 2 2 2 4 | | 1 | |
| 1 1 2 2 | 1 1 2 2 | 0 | 1 2 2 4 |
| 2 2 4 4 | | 1 | |
| 4 4 8 8 | | 2 | |
| 8 8 16 16 | | 3 | |
| 16 16 32 32 | | 4 | |
| 2 4 4 8 | 1 2 2 4 | 1 | 1 1 2 2 |
| 4 8 8 16 | | 2 | |
| 8 16 16 32 | | 3 | |

The steps of a process executed by the predictor 406 for predicting bits at the macroblock level using the basic vectors $\vec{b}$ are shown in Table 3. The actp values of an 8×8 pixel block for all four basic quantization vectors $\vec{b}$ are first determined, as described below. Then the actp values for all quantization vectors, QVs, are derived from the basic values through shift and addition operations, as described below. The actp values for a macroblock are then determined by summing the corresponding actp values of the six constituent pixel blocks. The corresponding bit count estimates are then determined at the macroblock level from the predetermined relationship between s_actp and bit count.

TABLE 3

| Step | Description | No. of outputs |
|---|---|---|
| 1 | Calculate act/actp at block level for basic QVs | no. of basic QVs * 6 |
| 2 | Derive act/actp values for all possible QVs | no. of QVs * 6 |
| 3 | Sum act/actp for a macroblock | no. of QVs |
| 4 | Determine corresponding bit rate from relationship between metric and data quantity values at the macroblock level | no. of QVs |

Figure 4:
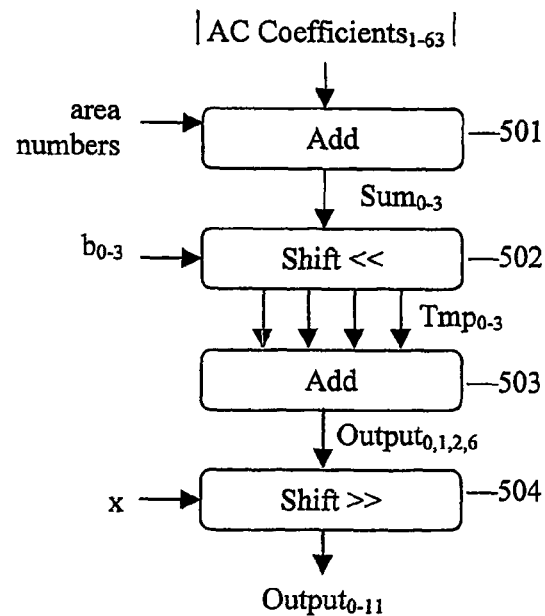
FIG. 4 is a flow diagram of a process executed by the predictor to determine s_actp from AC DCT coefficients.

The predictor 406 includes a simple and efficient hardware circuit to determine s_actp. A process executed by the hardware circuit for determining s_actp for all possible quantization vectors of a 8×8 pixel block is shown in FIG. 4. At step 501, the magnitudes of the AC coefficients are summed separately according to area number to form four values $sum_{0-3}$. At step 502, each of the four sums is shifted left by a respective element of the basic vector $\vec{b}$, and the four resulting values are stored in $tmp_{0-3}$. For example, if the quantization vector is [8 16 16 32], the quantization unit vector $\vec{q}_u$ is [1 2 2 4] and the corresponding basic vector from Table 2 is then [1 1 2 2], or [$2^0, 2^0, 2^1, 2^1$]. The sum for area 0, $sum_0$, is then shifted left by 0, and $sum_1$, $sum_2$, and $sum_3$ are shifted by 0, 1, and 1 bits, respectively. These shifted sums are added together to generate basic s_actp values at step 503. The s_actp values for an 8×8 pixel block are then found at step 504 by shifting x bits to the right from the basic s_actp values using the x values given in Table 2. The final value of s_actp for a macroblock is determined by processing six such pixel blocks and summing the s_actp values for each block.

The set of bit count estimates for each macroblock determined by the predictor 406 are processed by the selector module 405 to choose an optimal quantization vector for each macroblock, such that the sum of the predicted numbers of bits for the macroblocks of a video segment is less than the predetermined bit budget. A slightly lower bit budget can be used for this purpose to accommodate prediction errors that might otherwise result in the dropping of AC coefficients.

The quantization module 404 then quantizes the AC coefficients of the video segment stored in the segment memory 403 using the selected macroblock quantization vectors. These QVs are then mapped back to the corresponding quantization step size (QNO) and class number (CNO) using standard DV relationships, as shown in Table 4, to provide these parameters in the output bit stream, as required by the DV standard.

TABLE 4

| | Class Number CNO | | | | Area Number ANO | | | |
|---|---|---|---|---|---|---|---|---|
| | 0 | 1 | 2 | 3 | 0 | 1 | 2 | 3 |
| Quantization number QNO | 15 | | | | 1 | 1 | 1 | 1 |
| | 14 | | | | 1 | 1 | 1 | 1 |
| | 13 | | | | 1 | 1 | 1 | 1 |
| | 12 | 15 | | | 1 | 1 | 1 | 1 |
| | 11 | 14 | | | 1 | 1 | 1 | 1 |
| | 10 | 13 | 15 | | 1 | 1 | 1 | 1 |
| | 9 | 12 | 15 | 14 | 1 | 1 | 1 | 1 |
| | 8 | 11 | 14 | 13 | 1 | 1 | 1 | 2 |
| | 7 | 10 | 13 | 12 | 1 | 1 | 2 | 2 |
| | 6 | 9 | 12 | 11 | 1 | 1 | 2 | 2 |
| | 5 | 8 | 11 | 10 | 1 | 2 | 2 | 4 |
| | 4 | 7 | 10 | 9 | 1 | 2 | 2 | 4 |
| | 3 | 6 | 9 | 8 | 2 | 2 | 4 | 4 |
| | 2 | 5 | 8 | 7 | 2 | 2 | 4 | 4 |
| | 1 | 4 | 7 | 6 | 2 | 4 | 4 | 8 |
| | 0 | 3 | 6 | 5 | 2 | 4 | 4 | 8 |
| | | 2 | 5 | 4 | 4 | 4 | 8 | 8 |
| | | 1 | 4 | 3 | 4 | 4 | 8 | 8 |
| | | 0 | 3 | 2 | 4 | 8 | 8 | 16 |
| | | | 2 | 1 | 4 | 8 | 8 | 16 |
| | | | 1 | 0 | 8 | 8 | 16 | 16 |
| | | | 0 | | 8 | 8 | 16 | 16 |

The variable length encoding module 407 scans the quantized data in zigzag order according to the selected DCT mode of each 8×8 pixel block. The data is then run-length coded and the run-length codes are translated to variable length codes using a standard Huffman table. The encoded data is combined with the DC coefficients and its respective headers. The data is then re-arranged in a particular format specified by the DV specifications for output.

In an alternative embodiment, the video encoder can be implemented using the simpler act metric described above. The sum of spatial activity metric for a macroblock is then defined as:

$$s\_act_i = \sum_{k=1}^{6} \sum_{j=0}^{3} \frac{\sum |AC_{jk}|}{q_{jk}},$$

where i, j, k denotes specifically the $i^{th}$ macroblock in the video segment, the $k^{th}$ 8×8 pixel block in that macroblock and the area number j. The magnitude of the AC coefficients in a particular area of an 8×8 pixel block is summed and then divided by the common quantization step used in that area. In this embodiment, the predictor module 406 models the process of quantization and variable length coding using the s_act metric. It calculates the s_act values and then predicts the number of bits generated for all possible quantization vectors for a macroblock using an empirically determined relationship between s_act and the number of bits, as described below. S_act can be determined using a set of basic quantization vectors derived through a method similar to that described above for determining s_actp, but by considering only the quantization vectors.

Figure 5:
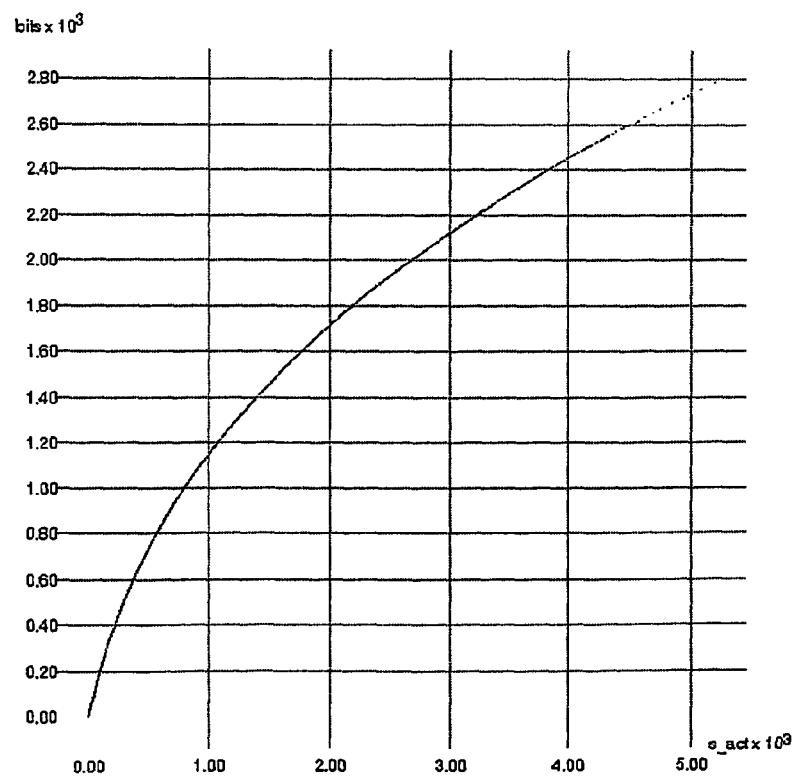
FIG. 5 is a graph of a power law function used by the predictor to represent the relationship between the number of bits generated by quantization and variable length coding and s_act, the sum of spatial activity metric values.

As described above, the relationship between metric values and the numbers of bits of encoded data can be implemented as a mathematical function or as a non-linear lookup table. The predictor 406 determines a bit count estimate from a metric value using a mathematical power law function. For example, the relationship between bits, the number of bits of encoded data, and s_act, the sum of spatial activity metrics of act, is represented by the equation:

$$bits + d = a*(s\_act + c)^b,$$

where a, b, c and d are adjustable parameters, with b<1, as shown in FIG. 5. Example values are a=195, b=0.35, c=160 and d=1152.

Similarly, the relationship of the actp metric and the number of bits is represented by the equation:

$$bits + d = a*(s\_actp + c)^b,$$

where s_actp refers to the sum of spatial activity metrics of actp, and a, b, c and d are the parameters of the optimal curve, with b<1. Example values corresponding to the weights {1,2, 4,8} are a=20.8, b=0.53, c15.5 and d=88.9.

The parameters for either equation are initially determined experimentally from a generic or reference video sequence by a calibration process. The calibration process is executed by a calibration system that is not part of the video encoder. The calibration system includes a processor and associated software modules having code for executing the steps of the calibration process. The equation parameters determined by the calibration process are stored in memory of the predictor 406 during manufacture.

The steps of the calibration process are as follows:
  (i) The weighted DCT coefficients of each macroblock in a single picture frame of the sequence are quantized by all possible quantization step sizes.
  (ii) The quantized data is variable length encoded to find the actual numbers of bits generated from the video frame for each quantization step size.
  (iii) The quantization step size for the bit rate closest to a target bit rate is selected.
  (iv) The sum of the metric values generated from the blocks quantized by that selected step size is calculated to determine a data point comprising the number of bits generated and the corresponding metric value for the selected frame.
  (v) Further data points are determined by repeating steps (iii)-(iv), for a range of different target bit rates.
  (vi) The best-fit curve that minimises the mean square error between the data points and the curve is found, ignoring outlying data points. A slight overestimation is employed. For example, the best fit curve can be offset so that it lies above 80% of the data points.
  (vii) The best-fit curve is used to estimate the bits generated for a selected macroblock of the reference video data for all possible quantization step sizes.

(viii) A step size is selected to obtain a bit rate closest to a target bit rate.
(ix) The quantized data is variable length encoded.
(x) Steps (vii)-(ix) are repeated for all macroblocks in a short video sequence, for example 120 frames.
(xi) The signal-to noise ratio (SNR) of the frames is calculated. For example, a peak SNR (pSNR) for an M×N frame is given by:

$$pSNR = 10 * \log_{10} \frac{255^2 * M * N}{\sum_{x=0}^{M-1}\sum_{y=0}^{N-1}[\hat{f}(x,y) - f(x,y)]^2}$$

where 255 is the gray scale range, f(x,y) is the pixel (x,y) value of the original frame and f̂(x,y) is the pixel (x,y) value of the encoded and then decoded frame.

For a sequence of N frames, the average of the pSNR values for all frames can be used as the SNR value.

(xii) The process from step (vii)-(xi) is repeated by adjusting the curve parameters to maximise the SNR of the video sequence.

The embodiments described above exploit block spatial activity metrics to determine a predicted value for the number of bits generated by video coding. However, these are not the only metrics suitable for this purpose. For example, the process of Huffman encoding was considered. Huffman coding is a form of entropy coding and is dependent on the occurrence probabilities for the different run-length symbols that are generated by run length encoding. It was observed that, through statistical averaging, the total codeword length converges, given a sufficient number of run-length symbols present. The number of run-length symbols can be found from the output of the processes of quantization, run-length length coding and partial Huffman coding. The partial Huffman coding here refers to the splitting of a (run, amplitude) code into two or more run-length symbols when an entry of run and amplitude was not found in the Huffman table. However, the actual process of repeated quantization and run-length coding is undesirable.

It was found that the number of weighted non-zero AC coefficients after quantization, referred to as sym, can be correlated with the number of data bits generated by encoding, the reason being that the Huffman table was designed for low occurrence of splitting (run, amplitude) codes, and that the relative difference between the numbers of run-length symbols and non-zero AC coefficients would be small, given a sufficient number of run-length symbols used. The number of weighted non-zero AC coefficients can be determined by counting the number of AC coefficients equal or greater than the quantization step size, the actual process of quantization is not necessary.

In a further embodiment, the predictor 406 of the video encoder of FIG. 2 models the process of quantization and variable length coding using a metric function to determine sym values from input video data. The predictor 406 calculates sym values and then determines estimates for the numbers of bits of encoded data generated for all possible quantization vectors for a macroblock using an empirically determined relationship between sym and the number of bits. The selector 405 then determines suitable quantization parameters by selecting, the bit count estimate closest to a desired bit count. The encoded data is then generated by a single-pass quantization and variable length encoding process.

It will be apparent that the process for selecting quantization parameters to obtain a desired bit rate using the sym metric is similar to the process described above using the spatial activity metrics. Consequently, only the significant differences will be described below.

Figure 6:
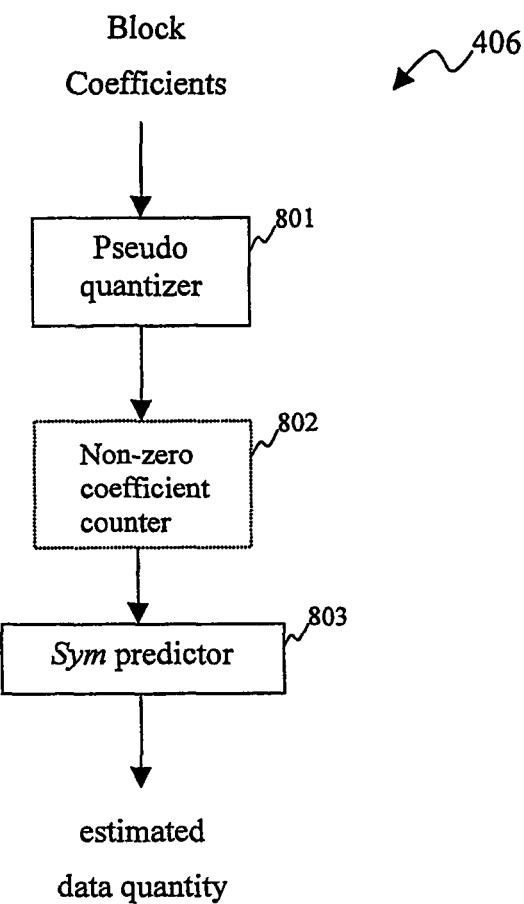
FIG. 6 is a block diagram of a second preferred embodiment of a predictor of the encoder.

As shown in FIG. 6, the predictor 406 of this embodiment includes a pseudo quantizer block 801, a non-zero AC coefficient counter 802, and a sym predictor 803. For a given set of quantization parameters, the bit rate of an 8×8 pixel block is estimated by the predictor 406 as follows. The pseudo quantizer block 801 reads in the pixel block coefficients sequentially and pseudo-quantizes them according to the quantization parameters. Pseudo-quantization, in the form of comparisons of the AC coefficients with quantization step sizes, is implemented rather than actual quantization. The non-zero coefficient counter 802 then processes the output of pseudo-quantization, and counts the number of non-zero quantized AC coefficients to determine sym. The sym predictor module 803 then generates an estimate for the bit count using the respective quantization parameters. This conversion of a sym value to a bit count estimate in the sym predictor 803 can be implemented using a mathematical function or a uniform look-up table, i.e., with one bit rate value for each of the possible sym values. This process is then repeated for all quantization parameters to determine corresponding bit count estimates. However, this implementation can be modified such that minimal repetition is needed, as described below.

A summary of the process of predicting bits at the macroblock level in the predictor 406 is given in Table 5. The numbers of non-zero AC coefficients after quantization are first counted for different step sizes and areas. The sym values for each macroblock for all quantization vectors (QVs) are then derived from these intermediate values, as described below. The macroblock sym is then determined by summing the six constituent block values. The corresponding bit count estimate is then determined from the macroblock sym value using a predetermined relationship between sym values and bit counts.

TABLE 5

| Step | Description | No. of outputs |
| --- | --- | --- |
| 1 | Calculate no. of non-zero AC coefficients for all blocks in a macroblock | no. of step sizes * no. of areas * 6 |
| 2 | Derive sym value according to step sizes in respective areas | no. of QVs * 6 |
| 3 | Sum sym values for a macroblock | no. of QVs |
| 4 | Determine the corresponding bit count estimates from the sym model at the macroblock level | no. of QVs |

Figure 7:
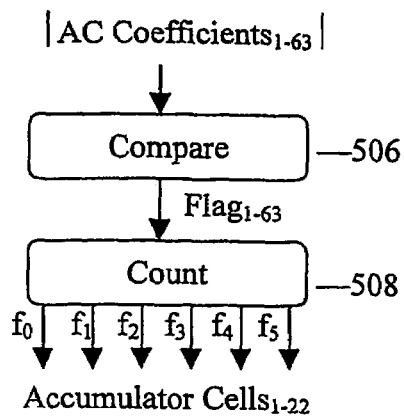
FIG. 7 is a flow diagram of a method executed by the predictor for determining sym, the number of non-zero AC DCT coefficients after quantization.
Figure 8:
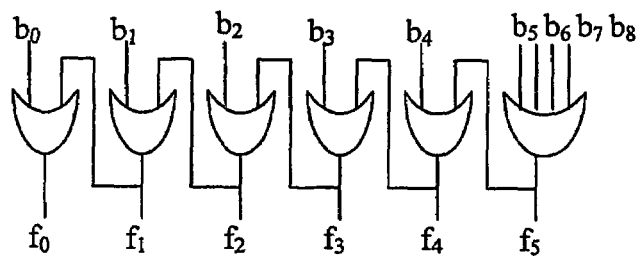
FIG. 8 is a schematic diagram of a comparator of the predictor, used to compute a 6 bit flag for determining sym.
Figure 9:
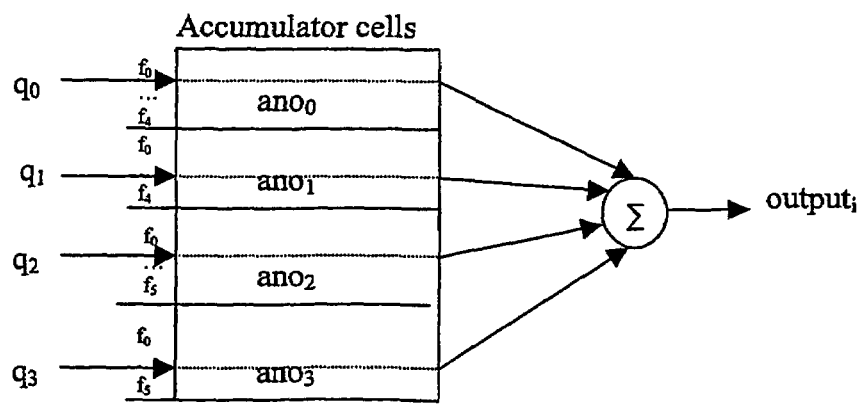
FIG. 9 is a schematic diagram illustrating the addition of accumulator cell values in the predictor for a selected quantization vector.

The predictor 406 uses a simple and efficient hardware circuit to determine sym values. A method for processing each 8×8 pixel block to determine sym values for all quantization vectors is shown in FIG. 7. At step 506, each of the 64 AC coefficients of a DCT block passed through a comparator comprising a series of OR gates, as shown in FIG. 8, to compute a respective 6-bit flag. The resulting flag bits $f_0$-$f_1$-$f_2$-$f_3$-$f_4$-$f_5$ represent Boolean values indicating whether the corresponding 9-bit AC coefficient $b_0$~$b_9$ is greater than or equal to the quantization coefficients 1-2-4-8-16-32, respectively. At step 508, each bit $f_i$ of all the flags for one area number (ANO) is counted and the resulting sum is stored in accumulator cells$_j$. For every quantization vector q0-q1-q2-q3, the corresponding accumulator cells are summed, as shown in FIG. 9. The value of sym for the macroblock is accumulated through processing six 8×8 pixel blocks.

For example, Table 6 shows a typical 8×8 pixel block after forward discrete cosine transform and weighting.

TABLE 6

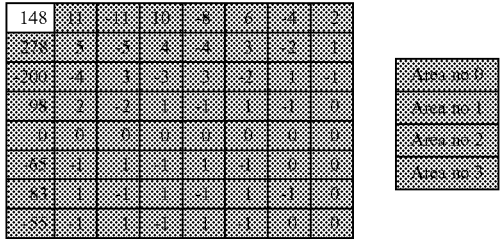

The processing of this block generates the accumulator cell values shown in Table 7 and gives the output sym values shown in Table 8 for each quantization vector.

TABLE 7

| Quantizer/ANO | | | | | |
|---|---|---|---|---|---|
| 1 | $f_0$ | | | | |
| 2 | $f_1$ | | | | |
| 4 | $f_2$ | | | | |
| 8 | $f_3$ | | | | |
| 16 | $f_4$ | | | | |
| 32 | $f_5$ | | | | |

TABLE 8

| Quantization vector | Output |
|---|---|
| 1 1 1 1 | 5 + 13 + 19 + 12 = 49 |
| 1 1 1 2 | 5 + 13 + 19 + 0 = 37 |
| 1 1 2 2 | 5 + 13 + 8 + 0 = 26 |
| 2 2 2 2 | 5 + 13 + 8 + 0 = 26 |
| 2 2 2 4 | 5 + 13 + 8 + 0 = 26 |
| 2 2 4 4 | 5 + 13 + 3 + 0 = 21 |
| 2 4 4 8 | 5 + 9 + 3 + 0 = 17 |
| 4 4 8 8 | 5 + 9 + 2 + 0 = 16 |
| 4 8 8 16 | 5 + 5 + 2 + 0 = 12 |
| 8 8 16 16 | 4 + 5 + 2 + 0 = 11 |
| 8 16 16 32 | 4 + 2 + 2 + 0 = 8 |
| 16 16 32 32 | 2 + 2 + 2 + 0 = 6 |

Figure 10:
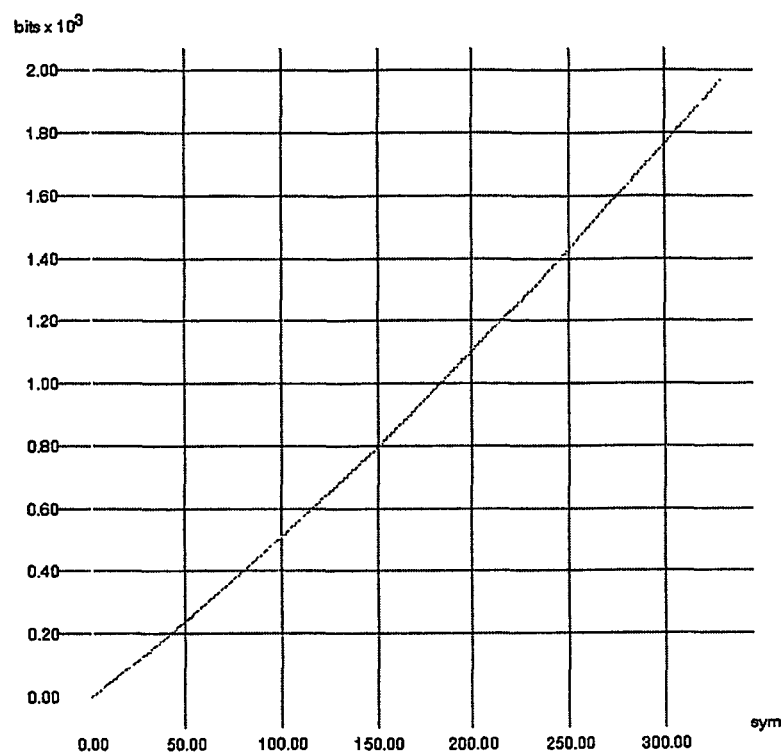
FIG. 10 is a graph of a power law function used by the predictor to represent the relationship between the number of bits generated through the process of quantization and variable length coding and sym.

The predictor 406 determines an estimate for the number of bits of encoded data from the number of non-zero AC coefficients after quantization (sym) using the equation $$bits + d = a*(sym+c)^b,$$

where a, b, c and d are the parameters of the optimal curve, with b>1, as shown in FIG. 10. Example values are a=1.05, b=1.28, c=80 and d=286.6. The parameters are determined empirically using a process similar to that described above for the spatial activity metrics.

Figure 11:
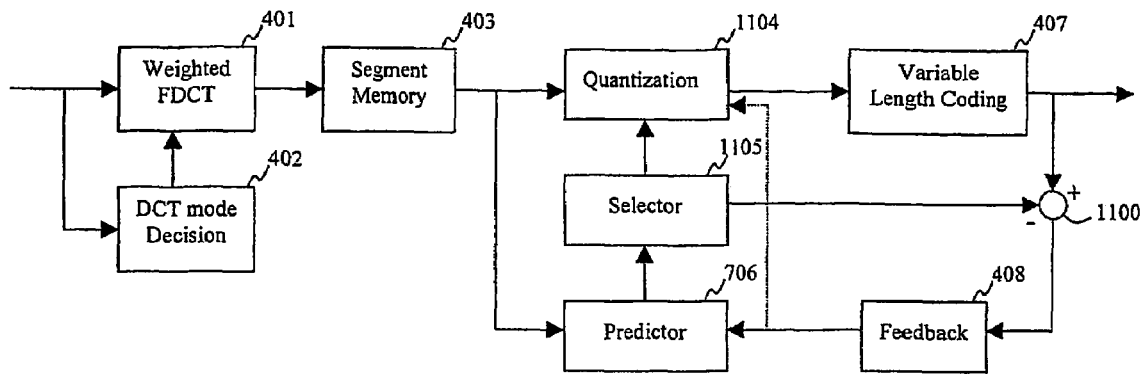
FIG. 11 is a block diagram of a second preferred embodiment of a video encoder, including feedback control.

In further alternative embodiments, the use of any of the metrics described above is adapted with feedback to further enhance the performance of the encoder. In one of these embodiments, the error between the actual bit generation and the predicted bits for a macroblock with its associated quantization vector is fed back into a feedback module 408, as shown in FIG. 11. A predictor module 706 is the same as the predictor 406 of FIG. 2, except that it receives and uses feedback data from the feedback module 408. Similarly, the quantization module 1104 is the same as the quantization module 404, but optionally receives feedback data from the feedback module 408. A selector 1105 is the same as the selector 405, but outputs the selected data quantity estimate to a difference module 1100. The difference module 1100 determines an error value representing the difference between this estimate and the corresponding actual quantity of encoded data from the VLC module 407. This is used by the feedback module 408 to determine a feedback error for each output macroblock. The feedback module 408 can be frame-based, video segment-based and/or macroblock-based. In a frame-based feedback module, the errors made in a frame for each s_act or sym value (depending upon which metric is being used) are received from the feedback module 408 and stored. At the end of each frame encoding, these errors are averaged. The mean error for each s_act (or sym) value is used to adjust the predictive model (i.e., the look-up table or the equation parameters stored in memory associated with the predictor 406) in the predictor module 706. For example, the mean error can be added to the equation parameter d. This ensures that the predictive model is adapted on a frame basis.

In addition, the feedback module 408 can be used to provide feedback for each video segment. The errors made in a video segment are accumulated, averaged and stored as a local adjustment for the next segment prediction, according to:

$$NextSegmentPrediction = CurrentSegmentPrediction + \delta * err_{vs},$$

where $\delta$ refers to the weight of the error of the previous video segment on the current video segment, and $err_{vs}$ is the mean error value of a previous video segment. An example is $\delta = 1.0$.

Macroblock-based feedback can be used together with frame-level feedback. Macroblock-level feedback provides finer control of error in prediction for a video segment. In operation, the current macroblock i is coded, and the number of expected bits for the video segment is calculated by the feedback module 408 according to:

$$ExpectedBits_{vs} = \sum_{j=0}^{i} ActualBits_{MB} + \sum_{j=i+1}^{5} PredictedBits_{MB}.$$

If the numbers of expected bits are above a threshold value, a coarser quantization vector is used for the remaining macroblocks to be coded in the same segment. Two thresholds can be used, and the quantization vector can be incremented by more than one for different thresholds. The thresholds are determined empirically. For example, two thresholds of 2560 and 2600 may be used, with incremental values of 1 and 2.

Figure 12:
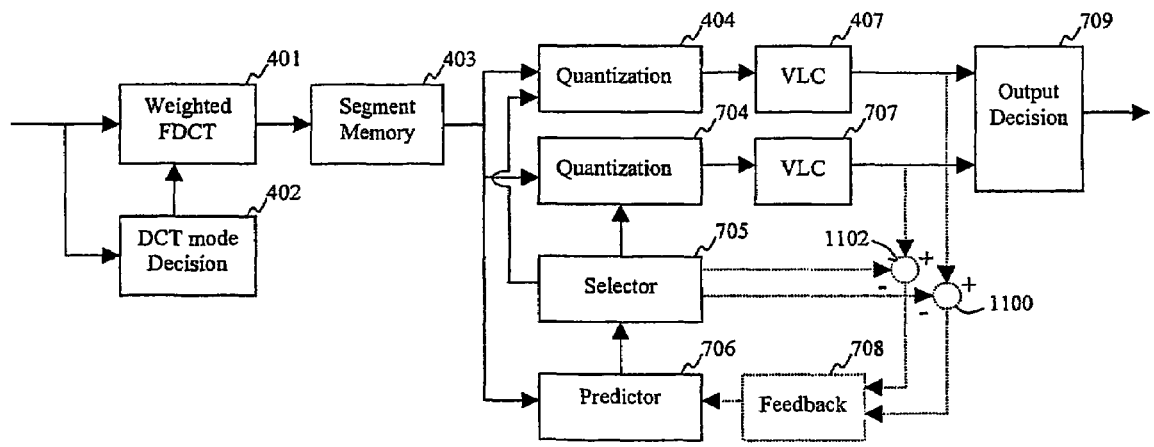
FIG. 12 is a block diagram of a third preferred embodiment of a video encoder, including two-pass encoding predictive rate control with or without frame-based feedback control.

In yet another embodiment, two-pass encoding is used to improve the signal-to-noise ratio (SNR) of video frames. As shown in FIG. 12, the video encoder of this embodiment includes additional quantization 704 and VLC 707 modules, and an output decision module 709. The encoder includes a selector module 705 that is the same as the selector module 1105, but with two sets of outputs, one for each encoding pass. Two identical difference modules 1100, 1102, send error values to a feedback module 708 that is the same as the feedback module 408, but has two error data inputs. In this embodiment, the selector module 705 selects the two optimal quantization vectors such that the bit budget is not exceeded.

The first quantization module 404 and variable length coding module 407 encode the segment data by the coarser selected quantization vector to generate macroblock output bits $\{len^1\}_{i=1}^5$. The second quantization module 704 and variable length coding module 707 encode the segment data by the finer selected quantization vector to generate macroblock output bits $\{len^2\}_{i=1}^5$.

The steps executed by the output decision module 709 are as follows. If the total number of output bits from the first quantization module 404 and variable length coding module 407, $$t_{vs} = \sum_{i=1}^5 len_i^1,$$

exceeds the bit budget, then the bits are output. Otherwise, the macroblocks are sorted in order of priority; for example, in order of descending coarseness of the quantization vectors. For the first macroblock j, the difference of the bits of the two quantization vectors, $d_j = len_j^2 - len_j^1$, is added to $t_{vs}$. If the added sum $s_{VS}$ is less than the bit budget, then the particular macroblock quantized by finer step size is transmitted, and $t_1$ is updated. The quantization and class numbers are adjusted accordingly. Otherwise, the macroblock with the coarser quantization is transmitted. The process is repeated for the remainder of the four macroblocks until the entire video segment is transmitted.

Alternatively, the error between the actual and estimated bits for the macroblock quantized by two step sizes is fed back, and the predictive model is adjusted; for example, using a frame-based feedback module 408. The two-pass concept can be further extended for three-pass encoding if necessary.

Figure 13:
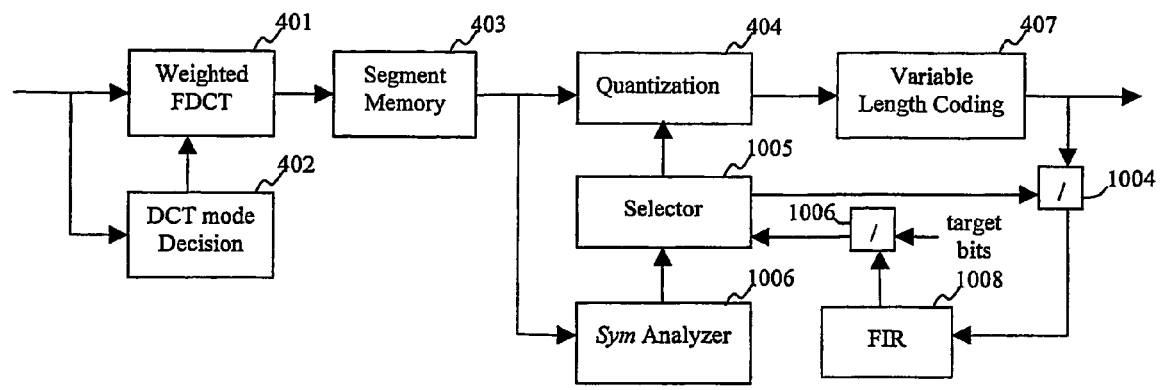
FIG. 13 is a block diagram of fourth preferred embodiment of a video encoder, based on sym values and with feedback control.
Figure 14:
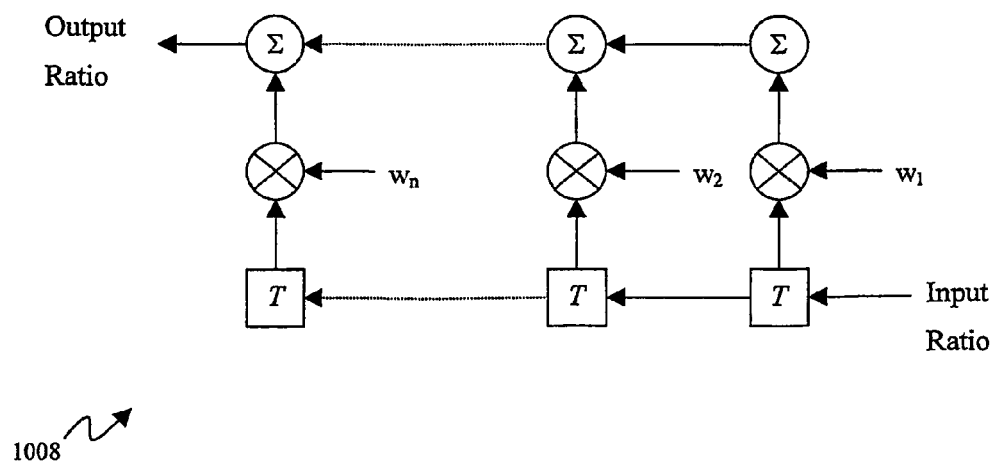
FIG. 14 is a schematic diagram illustrating a finite impulse response module of the encoder of FIG. 13.

As an alternative to generating bit count estimates for different step sizes, a target metric value (e.g., a desired sym value) corresponding to the target bit count can be determined from the relationship between metric values and bit counts. The process of selecting a bit count estimate closest to a target bit count then becomes a process of selecting a metric (e.g., sym) value closest to a target metric value. This method is employed, for example, by the sym-based video encoder shown in FIG. 13. A sym analyzer 1006 calculates sym values for different quantization vectors. The sym values are then transmitted to a selector 1005. The ratios of the actual numbers of bits generated from the output of the variable length encoding block 407 and the corresponding sym values are determined and stored for a number n of video segments by ratio modules 1004, 1006. A finite impulse response (FIR) module 1008, as shown in FIG. 14, then determines a ratio for an incoming video segment as the sum of the weighted ratios for the n previous video segments. The current target sym value corresponding to the target bit count is then determined by dividing the latter by the FIR ratio and fed as an input to the selector 1005. The selector 1005 selects a quantization vector such that the sym value for the video segment is less than the target sym value. The data is then encoded using the selected quantization vector by the quantizer block 404 and the variable length encoder 407. A two-pass topology, as described above, can be adapted here also.

The embodiments described above relate to digital video, wherein the total number of bits generated by encoding the macroblocks of a video segment are within a predetermined bit budget. For the case of MPEG-2 [ISO-IEC/JTC1/SC29/SC29/WG11, "Test Model 5", Draft, April 1993] rate control, it will be readily be appreciated that embodiments of the invention can be applied to select an appropriate macroblock reference quantization parameter such that the actual encoded bits follow the allocated target bits of a frame closely. The bits to be generated by a frame picture are estimated for all different quantization step sizes involved. The optimal step sizes for the macroblocks are chosen such that the difference between the target and estimated bit use is minimal. Alternatively, in variable bit rate coding where consistent picture quality is expected, the invention can be employed to estimate the bit rate for a target quantization step such that, given some constraints on the bit rate, for example maximum, minimum or average bit rate, the target quantization steps with the least deviation from these constraints can be generated.

Many modifications will be apparent to those skilled in the art without departing from the scope of the present invention as herein described with reference to the accompanying figures.

The invention claimed is:

1. A method for use in encoding input video data, comprising:
   determining a relationship between metric values generated from reference video data using a metric function and respective first encoding parameters, and quantities of encoded video data generated by encoding said reference video data using said respective first encoding parameters;
   using said metric function to generate metric values from said input video data and respective second encoding parameters;
   selecting at least one of said second encoding parameters on the basis of a desired quantity of encoded video data and said relationship; and
   under control of at least one of a configured hardware circuit and a configured computer, encoding said input video data using the selected at least one encoding parameter,
   wherein said metric function is a spatial activity metric function based on a sum of weighted AC discrete cosine transformation coefficients and is of the form, $$\sum_{u,v} \frac{|f(u,v)|}{w(u,v)q(u,v)},$$

where f(u,v) is a discrete cosine transformation coefficient of a block element with coordinates (u, v), w(u,v) is a weight for said coefficient, and q(u,v) is a quantization parameter for said coefficient.

2. A method as claimed in claim 1, wherein said relationship is a power law relationship.

3. A method as claimed in claim 1, wherein said metric function is based on AC coefficients of discrete cosine transformation data generated from said video data.

4. A method for use in encoding input video data, comprising:
   determining a relationship between metric values generated from reference video data using a metric function and respective first encoding parameters, and quantities of encoded video data generated by encoding said reference video data using said respective first encoding parameters;
   using said metric function to generate metric values from said input video data and respective second encoding parameters;
   selecting at least one of said second encoding parameters on the basis of a desired quantity of encoded video data and said relationship; and under control of at least one of a configured hardware circuit and a configured computer, encoding said input video data using the selected at least one encoding parameter, wherein said metric function is a spatial activity metric function based on a sum of weighted AC discrete cosine transformation coefficients and is of the form, $$\sum_{u,v} \frac{|f(u,v) * h(u,v)|}{w(u,v)q(u,v)} =,$$

where f(u,v) is a discrete cosine transformation coefficient of a block element with coordinates (u, v), w(u,v) is a weight for said coefficient, q(u,v) is a quantization parameter for said coefficient, and h(u,v) is a spatial weighting factor for said coefficient.

5. A method as claimed in claim 1, wherein metric values are determined for each 8×8 pixel block of said video data using said metric function.

6. A method as claimed in claim 5, including determining a metric value for a macroblock by summing metric values for the constituent 8×8 pixel blocks.

7. A method as claimed in claim 1, including determining basic metric values from said metric function and basic encoding parameters, and deriving metric values from said basic metric values.

8. A method as claimed in claim 7, including deriving said metric values from said basic metric values using shift and add operations.

9. A method as claimed in claim 1, wherein said metric function is based on the number of non-zero AC discrete cosine transformation coefficients after quantization.

10. A method as claimed in claim 9, wherein said metric function is used to determine metric values for a macroblock of six 8×8 pixel blocks.

11. A video encoding module for use in encoding input video data, comprising:
    means for determining a relationship between metric values generated from reference video data using a metric function and respective first encoding parameters, and quantities of encoded video data generated by encoding said reference video data using said respective first encoding parameters, during a calibration process;
    means for storing said relationship;
    means for using said metric function to generate metric values from said input video data and respective second encoding parameters; and
    means for selecting at least one of said second encoding parameters on the basis of a desired quantity of encoded video data and said relationship,
    wherein said metric function is a spatial activity metric function based on a sum of weighted AC discrete cosine transformation coefficients and is of the form, $$\sum_{u,v} \frac{|f(u,v)|}{w(u,v)q(u,v)},$$

where f(u,v) is a discrete cosine transformation coefficient of a block element with coordinates (u, v), w(u,v) is a weight for said coefficient, and q(u,v) is a quantization parameter for said coefficient.

12. A video encoding module for use in encoding input video data, comprising:
    means for determining a relationship between metric values generated from reference video data using a metric function and respective first encoding parameters, and quantities of encoded video data generated by encoding said reference video data using said respective first encoding parameters, during a calibration process;
    means for storing said relationship;
    means for using said metric function to generate metric values from said input video data and respective second encoding parameters; and
    means for selecting at least one of said second encoding parameters on the basis of a desired quantity of encoded video data and said relationship,
    wherein said metric function is a spatial activity metric function based on a sum of weighted AC discrete cosine transformation coefficients and is of the form, $$\sum_{u,v} \frac{|f(u,v) * h(u,v)|}{w(u,v)q(u,v)},$$

where f(u,v) is a discrete cosine transformation coefficient of a block element with coordinates (u, v), w(u,v) is a weight for said coefficient, q(u,v) is a quantization parameter for said coefficient, and h(u,v) is a spatial weighting factor for said coefficient.

13. A video encoding module, comprising:
    a memory configured to store a relationship between metric values generated from reference video data using a metric function and respective first encoding parameters, and quantities of encoded video data generated by encoding the reference video data using the respective first encoding parameters, the relationship determined during a calibration process;
    a predictor module configured to use the metric function to generate metric values from input video data and respective second encoding parameters; and
    a selector module configure to select at least one of the second encoding parameters on the basis of a desired quantity of encoded video data and the relationship,
    wherein the metric function is a spatial activity metric function based on a sum of weighted AC discrete cosine transformation coefficients and is of the form, $$\sum_{u,v} \frac{|f(u,v)|}{w(u,v)q(u,v)},$$

where f(u,v) is a discrete cosine transformation coefficient of a block element with coordinates (u,v), w(u,v) is a weight for the coefficient, and q(u,v) is a quantization parameter for the coefficient, and
    wherein the video encoding module further includes at least one of a dedicated hardware circuit configured to implement the predictor module, and a processor configured to execute the predictor module.

14. The video encoding module of claim 13, wherein said relationship is a power law relationship.

15. A video encoding module, comprising:
    a memory configured to store a relationship between metric values generated from reference video data using a metric function and respective first encoding parameters, and quantities of encoded video data generated by encoding the reference video data using the respective first encoding parameters, the relationship determined during a calibration process;
a predictor module configured to use the metric function to generate metric values from input video data and respective second encoding parameters; and
a selector module configure to select at least one of the second encoding parameters on the basis of a desired quantity of encoded video data and the relationship,
wherein the metric function is a spatial activity metric function based on a sum of weighted AC discrete cosine transformation coefficients and is of the form, $$\sum_{u,v} \frac{|f(u, v) * h(u, v)|}{w(u, v)q(u, v)},$$

where $f(u,v)$ is a discrete cosine transformation coefficient of a block element with coordinates $(u,v)$, $w(u,v)$ is a weight for the coefficient, $q(u,v)$ is a quantization parameter for the coefficient, and $h(u,v)$ is a spatial weighting factor for the coefficient, and
wherein the video encoding module further includes at least one of a dedicated hardware circuit configured to implement the predictor module, and a processor configured to execute the predictor module.

16. The video encoding module of claim 15, wherein metric values are determined for each 8x8 pixel block of said video data using said metric function.

17. A method, comprising:
determining a relationship between first metric values and respective quantities of encoded video data, the first metric values generated by encoding reference video data from a reference video, the reference video including a plurality of macroblocks, using a metric function and respective first encoding parameters;
after determining the relationship, under control of a video encoder that is at least one of a configured hardware circuit and a programmed computer:
receiving an input video, the input video including a plurality of macroblocks distinct from the plurality of macroblocks of the reference video;
generating second metric values from input video data of the input video using respective second encoding parameters;
selecting at least one of the second encoding parameters based on a desired quantity of encoded video data and the relationship between the first metric values and the respective quantities of encoded video data; and
encoding the input video data using the selected at least one encoding parameter.

18. The method of claim 17 further including, after the determining the relationship between first metric values and respective quantities of encoded video data and before receiving the input video, storing the relationship for use in the selecting at least one of the second encoding parameters based on the desired quantity of encoded video data and the relationship.

19. The method of claim 17 wherein the determining the relationship between first metric values and respective quantities of encoded video data is performed as part of a calibration process, and wherein the receiving the input video occurs after the calibration process is performed.

20. The method of claim 17, wherein the relationship is a power law relationship.

21. The method of claim 17, wherein the metric function is one of at least:
based on AC coefficients of discrete cosine transformation data generated from video data, and
a spatial activity metric function based on a sum of weighted AC discrete cosine transformation coefficients.

22. The method of claim 17, further comprising: determining basic metric values from the metric function and basic encoding parameters; and
deriving metric values from the basic metric values.

23. The method of claim 22, wherein the deriving metric values includes deriving the metric values from the basic metric values using shift and add operations.

24. The method of claim 17, wherein the selecting the at least one of the second encoding parameters based on a desired quantity of encoded video data and the relationship between the first metric values and the respective quantities of encoded video data is performed using the second metric values.

25. A video encoding module, comprising:
a memory configured to store a predetermined relationship between first metric values and respective quantities of encoded video data, the predetermined relationship being determined during a calibration process and based at least in part on generating the first metric values from reference video data of a reference video, the reference video including a plurality of macroblocks, using a metric function and respective first encoding parameters, and generating the respective quantities by encoding the reference video data using the respective first encoding parameters;
a predictor module configured to receive input video data from an input video, the input video including a plurality of macroblocks distinct from the plurality of macroblocks of the reference video, and to generate second metric values from the input video data using the metric function and respective second encoding parameters; and
a selector module configured to select at least one of the second encoding parameters based on a desired quantity of encoded video data and the stored predetermined relationship,
wherein the video encoding module further includes at least one of a dedicated hardware circuit configured to implement the predictor module, and a processor configured to execute the predictor module.

26. The video encoding module of claim 25, wherein the predetermined relationship is a power law relationship.

27. The video encoding module of claim 25, wherein the metric function is one of at least:
based on AC coefficients of discrete cosine transformation data generated from video data, and
a spatial activity metric function based on a sum of weighted AC discrete cosine transformation coefficients.

28. The method of claim 17 wherein the first and second encoding parameters are quantization vectors.

29. The video encoding module of claim 25 wherein the first and second encoding parameters are quantization vectors.

* * * * *

UNITED STATES PATENT AND TRADEMARK OFFICE
CERTIFICATE OF CORRECTION

Page 1 of 1

PATENT NO. : 9,031,128 B2
APPLICATION NO. : 10/500453
DATED : May 12, 2015
INVENTOR(S) : Chiang et al.

It is certified that error appears in the above-identified patent and that said Letters Patent is hereby corrected as shown below:

On the title page item [75]

"Patricia Wei Yun Chiang, Singapore (SG); Jucas Y.W. Hui, Singapore (SG)" should read,
--Patricia Wei Yin Chiang, Singapore (SG); Lucas Y.W. Hui, Singapore (SG)--.

Signed and Sealed this
Third Day of November, 2015

Michelle K. Lee
*Director of the United States Patent and Trademark Office*